United States Patent [19]

Hagin et al.

[11] Patent Number: 4,817,987

[45] Date of Patent: Apr. 4, 1989

[54] STRUCTURAL ELEMENT FOR SUPPORTING THE CHASSIS OR SUPERSTRUCTURE OF A MOTOR VEHICLE ON A WHEEL

[75] Inventors: Faust Hagin, Munich; Gerd Rühmann, Gilching, both of Fed. Rep. of Germany

[73] Assignee: MAN Nutzfahrzeuge GmbH, Munich, Fed. Rep. of Germany

[21] Appl. No.: 51,506

[22] Filed: May 18, 1987

[30] Foreign Application Priority Data

Jun. 28, 1986 [DE] Fed. Rep. of Germany ....... 3621821
Mar. 28, 1987 [DE] Fed. Rep. of Germany ....... 3710421

[51] Int. Cl.$^4$ ............................................. B62D 21/00
[52] U.S. Cl. .................................................... 280/788
[58] Field of Search ............... 280/666, 670, 688, 696, 280/701, 724, 788

[56] References Cited

U.S. PATENT DOCUMENTS

| | | | |
|---|---|---|---|
| 2,100,040 | 11/1937 | Sterling | 280/788 |
| 2,290,923 | 7/1942 | Wahlberg | 280/788 |
| 2,325,894 | 8/1943 | Wahlberg et al. | 280/670 |
| 2,554,261 | 5/1951 | Munger | 280/788 |
| 2,811,372 | 10/1957 | Parker et al. | 280/724 |

FOREIGN PATENT DOCUMENTS 143381 9/1951 Australia ............................ 280/724

*Primary Examiner*—David M. Mitchell
*Assistant Examiner*—Ross Weaver
*Attorney, Agent, or Firm*—Scully, Scott, Murphy & Presser

[57] ABSTRACT

The chassis of a motor vehicle is fitted with spaced bearer bars running parallel to the lateral longitudinal members of the chassis, with which the bars are connected at their ends by junction plates. Each bearer bar has a horizontally extending center part with downwardly extending arms at its ends. The center part bears on a wheel spring. There are further junction plates connecting the center part of the bar with the respective longitudinal beam.

9 Claims, 1 Drawing Sheet

STRUCTURAL ELEMENT FOR SUPPORTING THE CHASSIS OR SUPERSTRUCTURE OF A MOTOR VEHICLE ON A WHEEL

BACKGROUND OF THE INVENTION

The invention relates to a structural element for supporting the chassis or superstructure of a vehicle, more especially a motor vehicle, on rotary or other wheel axle, via a spring whose longitudinal axis is aligned with the direction of vertical spring action.

Structural elements of this type are known having semi-arcuate cantilever bars extending to the side of the longitudinal beams of the chassis with which they are connected for the transmission of forces. Owing to the bending moments such an arrangement means that the longitudinal bars have to have a very high degree of strength. In accordance with a further design the bars supporting the axial springs are full arcs which have a relatively high degree of flexural strength and are attached to two respective lateral frame brackets or ribs. A shortcoming here is the complexity of manufacture in connection with the full arc bars.

SUMMARY OF THE INVENTION

One object of the present invention is to devise a structural element of the type described so that it has a simple structure to manufacture.

A further aim of the invention is to provide a structural element of the sort in question which does not include high-price components.

In accordance with a still further aim of the invention, the structural element is to provide for a satisfactory distribution and transfer of forces to the chassis or superstructure of the vehicle.

In order to meet these or other aims of the invention, a structural element of the type indicated above is so designed that the spring bearer of the chassis or superstructure is connected with a bar extending in the longitudinal direction of the vehicle, such bar being bent downwards in front of and behind the spring bearer so that there is saddle-like center piece connected with the spring bearer in a horizontal plane which is offset in an upward direction in relation to the plane in which the bearer bar has its ends fixed to the chassis or superstructure. Convenient further developments of the invention will be seen from the claims.

In the design in accordance with the invention it is possible for the support of the chassis or of the vehicle superstructure on the respective vehicle wheel axle to be associated with the chassis part with a relative degree of freedom of design. Use is made of simply formed sheet metal elements or simple strip with a suitable dimension and the invention provides a structural element in which the spring end, and the chassis itself, associated with the superstructure may be very exactly aligned together and wear is practically out of the question. The structural element has a substantial inherent stiffness without this being at the sacrifice of an excessive increase in weight and size.

The invention will now be described in detail with reference to the drawings.

LIST OF THE VIEWS OF THE DRAWINGS

DETAILED ACCOUNT OF THE WORKING EMBODIMENT OF THE INVENTION

Figure 1:
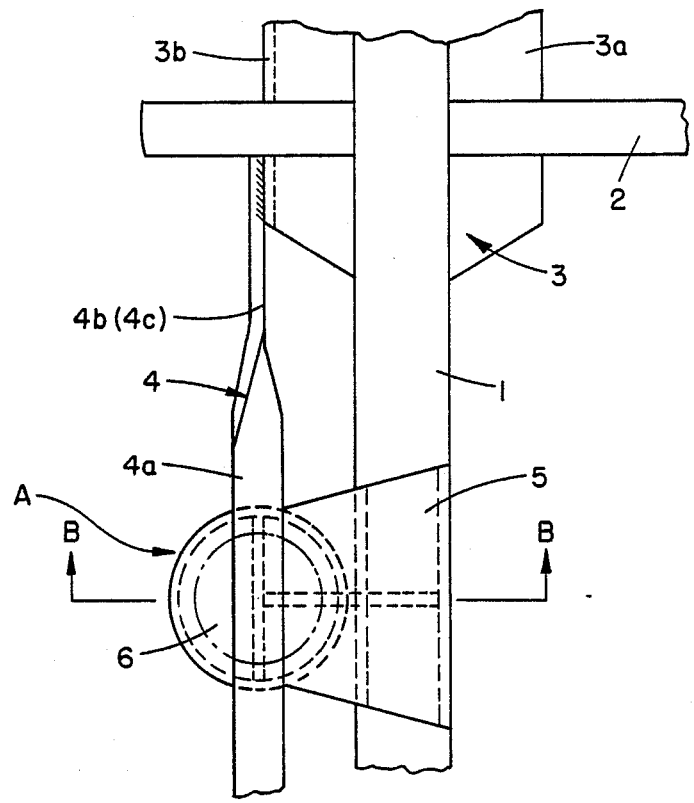
FIG. 1 is a plan view of the arrangement with the structural element imagined as being symmetrically arranged in relation to the line B—B.
Figure 2:
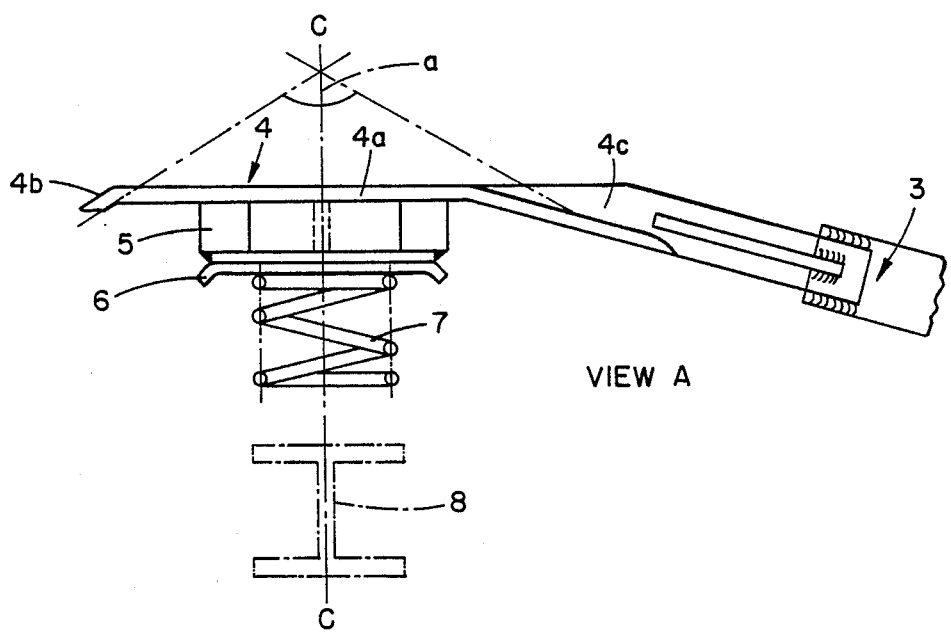
FIG. 2 is an elevation looking in the direction of the arrow A of FIG. 1, the structural element being imagined as being symmetrical in relation to the line C—C in the figure.

The figures show one of the two longitudinal load bearing members or beams and one of a number of transverse load bearing beams of a heavy road vehicle, as for example a road truck. The transverse beams serve to connect the two longitudinal beams together. The longitudinal beams are adjacent to the two longitudinal sides of the chassis. The longitudinal beam is referenced 1 and the transverse beam is referenced 2. The two beams are rigidly joined together, as for example by welds or riveted joints. In order to reinforce the m connection between the longitudinal beam 1 and the transverse beam 2 there is a junction plate 3 which is made up of a horizontal plate member $3a$ with a vertical flange $3b$. By means of the horizontal plate member $3a$ the junction plate 3 is joined, and more especially welded, to the longitudinal beam 1 and the transverse beam 2. The vertical flange $3b$ is directed downwards from the plate member $3a$.

To the side of the longitudinal beam 1, on the outer side of the chassis, there is the bearer bar 4 in accordance with the invention, which is of simple form insofar as it has the cross section of an elongated rectangle (whose long sides are horizontal) from end to end. Such strip material cut to the desired length has a horizontal center part $4a$ at whose two ends the bar 4 is bent in a downward direction. The saddle-like center piece $4a$ is generally in the horizontal plane of the top side of the longitudinal chassis beam 1. The downwardly bent end parts $4b$ and $4c$ or arms accordingly come to an end in a horizontal plane, which is vertically under that plane in which the center piece $4a$ and the top side of the longitudinal beam are located.

On the lower side of the saddle-like center piece $4a$ the upper spring bearing 6 for a vertically arranged helical spring 7 is located and attached which may also be a suitably acting other form of spring such as more especially a pneumatic spring or a rubber spring. In the case of the helical spring the spring bearer 6 is in the form of a spring bearer plate while in the case of any other form of spring the spring bearer plate will have to have a suitably modified design. The two ends of the bar 4 are attached at each chassis beam 2 with the latter and to the longitudinal beams 1. The lower end of the helical spring 7 bears against a rotary or non-rotary wheel axle, preferably one in the form of one of the two ends of an axle member 8 having at least one wheel.

The forces needed for supporting the chassis or superstructure are transmitted at the outer ends of the bar 4 as tensile forces to its downwardly directed, tensilely loadable ends parts $4b$ and $4c$ and are the passed on as vertical resultant forces by means of the spring 7 to the axle member 8. Owing to the exclusive loading in the form of tensile forces in the end parts $4b$ and $4c$ it is sufficient if the bar 4 has a rectangular cross section with relatively small dimensions. On the other hand the bar 4 is capable of yielding in other directions to an extent that may be undesired having regard to an exact alignment of the upper spring bearer 6 with the chassis.

In order to avoid this possibility without involving a heavy construction, the bar 4 is so twisted, in accordance with a further feature of the invention, about its longitudinal axis that the cross section of the strip material is in the form of a horizontal rectangle at the center part and at the outer ends of the end parts 4b and 4c it is in the form of a upright rectangle and the bar is flexurally yielding at the end parts in the transverse direction of the vehicle.

In view of the small flexural loading in the vertical direction it is necessary in any case for the distance between the line of action of the spring 7 and the downward bends of the center piece 4a running into the end parts 4b and 4c to be kept small.

Apart from the twisting of the two end parts 4b and 4c the bar is a component which is straight in the longitudinal direction and in the case of the junction plates 3 and their design with a horizontal plate member 3a and a vertical flange 3b the connection of the bar member ends is particularly simple to produce by welding the vertically standing ends of the strip material to the vertical flange 3b of the respective junction plate 3.

In order to prevent tilting of the spring bearer around the longitudinal axis this spring bearer 6 is supported by a further flange 5 directly on the chassis longitudinal beam 1. The flange 5, which has ribs to render it flexurally stiff, is so arranged that its outer end is between the spring bearer 6 and the bar 4 and connected with both of same, whereas its inner end is attached to the top side of the longitudinal bar of the chassis.

The angle α subtended by extensions of the two end parts 4b and 4c is a result of practical requirements and will be determined by the designer as a matter of routine from case to case. The optimum design is one in which the two bar parts on the two sides of the saddle-like center piece are only subject to tension and are thus so dimensioned that they are able to take up the likely tensile forces.

We claim:

1. A structural element for supporting part of a vehicle on a wheel thereof comprising:
   a longitudinal beam extending in the lengthwise direction of the vehicle,
   a spring with an upright line of action vertically resiliently supporting said longitudinal beam in relation to said wheel of said vehicle,
   a bracket-like spring bearer attached to said longitudinal beam and connected with a top part of said spring,
   a spring bearer bar extending in the longitudinal direction of the vehicle, said bearer bar having a saddle-like center part joined to said spring bearer and having arms extending out from said saddle, said arms being downwardly directed to positions at which they are joined with said longitudinal beam, such positions being at a lower level than said center saddle-like part, said arms of said bearer bar between said joining positions and said saddle-like center part being flexible in the transverse direction of the vehicle and resistive to tensile forces.

2. The structural element as claimed in claim 1 wherein said bearer bar is downwardly bent at positions directly in front of and to the rear of said spring bearer.

3. The structural element as claimed in claim 1 wherein said bearer bar has a cross section in the form of an elongated rectangle and it is so twisted that such cross sectional rectangle is upright in said arms in front of and behind said center saddle-like part and at said saddle-like part is horizontal.

4. The structural element as claimed in claim 1, wherein said bearer bar is located alongside said longitudinal beam; and junction plates for fastening the ends of said bar being connected to said longitudinal beam.

5. The structural element as claimed in claim 4 further comprising two transverse beams connected with said longitudinal beam at and by said junction plates, said spring bearer being located in the center between the transverse beams to the side of said longitudinal beam.

6. The structural element as claimed in claim 5 wherein the spring bearer is connected via such a horizontal junction plate directly with the longitudinal beam.

7. The structural element as claimed in claim 6 wherein said horizontal junction plate includes at least one stiffening rib.

8. The structural element as claimed in claim 4 wherein ends of said arms of said bar are attached to vertical ribs of said respective junction plates.

9. The structural element as claimed in claim 1 wherein said spring is a helical spring with an upright axis.

* * * * *